United States Patent
Ash et al.

(10) Patent No.: US 6,380,495 B1
(45) Date of Patent: Apr. 30, 2002

(54) METHOD FOR CONTROLLING AN AMOUNT OF MATERIAL DELIVERED DURING A MATERIAL TRANSFER

(75) Inventors: Raymond Houston Ash, Cincinnati; David Arthur Chappell, West Chester; Lara Jeanne Ivey, Cincinnati, all of OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 09/584,884

(22) Filed: Jun. 1, 2000

Related U.S. Application Data

(60) Provisional application No. 60/167,401, filed on Nov. 24, 1999.

(51) Int. Cl.[7] .............................................. G01G 13/02
(52) U.S. Cl. ......................... 177/116; 222/55; 222/56; 222/77
(58) Field of Search ............................. 177/1, 116, 60, 177/519; 222/1, 77, 55, 56; 141/1, 192, 86, 311 A, 83

(56) References Cited

U.S. PATENT DOCUMENTS

| | | | |
|---|---|---|---|
| 3,595,328 A | | 7/1971 | Griem, Jr. ........................ 177/1 |
| 3,685,602 A | | 8/1972 | Mayer .......................... 177/70 |
| 3,708,026 A | | 1/1973 | Senour .......................... 177/60 |
| 3,763,963 A | | 10/1973 | Wisznia ........................ 186/1 R |
| 3,856,097 A | | 12/1974 | Bartlo et al. .................... 177/1 |
| 4,040,496 A | | 8/1977 | Wilson et al. ............... 177/105 |
| 4,222,448 A | | 9/1980 | Sunkle et al. .................. 177/1 |
| 4,836,685 A | * | 6/1989 | Verreault ....................... 222/56 |
| 4,843,579 A | * | 6/1989 | Andrews et al. ............. 177/116 |
| 5,038,971 A | * | 8/1991 | Gayer et al. ................... 222/83 |
| 5,148,943 A | * | 9/1992 | Moller ......................... 222/77 |
| 5,381,837 A | * | 1/1995 | Kurosu et al. ................. 141/83 |
| 5,889,235 A | * | 3/1999 | Kawanishi et al. ........ 177/25.18 |
| 5,992,686 A | * | 11/1999 | Cline et al. ..................... 222/1 |
| 6,057,514 A | * | 5/2000 | Maguire ...................... 177/105 |
| 6,188,936 B1 | * | 2/2001 | Maguire et al. .............. 222/56 |

FOREIGN PATENT DOCUMENTS

GB 2121015 * 5/1983 ................. 141/83

* cited by examiner

Primary Examiner—Randy W. Gibson
(74) Attorney, Agent, or Firm—Jack L. Oney, Jr.

(57) ABSTRACT

A method for controlling an amount of material delivered during a material transfer. This method includes the steps of inputting a target amount for a material to be delivered from a source location to a target location, updating the target amount during the delivery of the material using a predictive model-based algorithm, and updating the predictive model-based algorithm based on process performance data using a recursive least-squares procedure. An adaptive selection algorithm which is used to determine whether at least one previous predictive model-based algorithm parameter should be replaced with at least one new predictive model-based algorithm parameter in order to adapt the predictive model-based algorithm in response to a process change. A method for overlapping a delivery of at least one independently measured material with a delivery of a main material during a material transfer process.

7 Claims, 8 Drawing Sheets

● Center Point of Selection Box, current average spill and flow
■ Center Point of Reference Box
① Location of new data point within smallest selection box
② Location of new data point within selection box 2
③ Location of new data point within reference box
④ Location of new data pont outside of reference box

METHOD FOR CONTROLLING AN AMOUNT OF MATERIAL DELIVERED DURING A MATERIAL TRANSFER

CROSS-REFERENCE TO RELATED APPLICATION

This application is a non-provisional filing of our earlier provisional application, U.S. Serial No. 60/167,401, filed Nov. 24, 1999.

FIELD OF THE INVENTION

The present invention relates to weighing and delivery systems and more particularly to an improved method for controlling an amount of material delivered during a material transfer.

BACKGROUND OF THE INVENTION

In many batch weighing/mixing systems, materials are fed into a mix tank in a sequence and according to amounts determined by a recipe, or formula. The materials are often fed into the mix tank at varying feed rates. In some systems, the feed rate varies from less than one pound per second to more than three hundred pounds per second. Regardless of the feed rates, it is desired to feed the exact amount of material into the batch in the shortest possible time. This means feeding at maximum feed rates for as long as possible and then, as the feed amount approaches a target amount, stopping the feed to achieve the exact desired amount of material without reducing the product feed rate.

During the feeding of the material, the scale reading at any moment is different from the actual amount of material fed or the final weight that would result if feed were stopped, or cut off, at that exact moment. The difference between the final batch weight and scale reading at cutoff is called Spill. For this reason, it is not possible to feed the material at maximum flow and then stop the feed when the scale reading reaches the target weight to achieve the exact desired amount of material.

One traditional approach to this problem uses a two-stage feed which switches to a slow, dribble feed as the scale reading reaches a set percentage (typically 80–90%) of the target. Variations on this approach use multi-stage feeds or throttling valves, but all have the effect of lengthening feed time. Accuracy can be improved by lowering the dribble rate, at the expense of feed time. Agitators in the process cause significant scale noise, which can only be reduced or eliminated mechanical or electronic filtering, increasing the tradeoff between accuracy and feed time.

What is needed is a method to quantify and predict what the Spill will be during the material feed. Furthermore, a method is needed to better control the amount of material delivered during a material transfer according to a desired amount.

BRIEF DESCRIPTION OF THE DRAWINGS

While the specification concludes with claims which particularly point out and distinctly claim the present invention, it is believed that the present invention will be better understood from the following description of preferred embodiments, taken in conjunction with the accompanying drawings, in which like reference numerals identify like elements and wherein:

SUMMARY OF THE INVENTION

The present invention relates to a method for controlling an amount of material delivered during a material transfer. This method includes the steps of inputting a target amount for a material to be delivered from a source location to a target location, updating the target amount during the delivery of the material using a predictive model-based algorithm, and updating the predictive model-based algorithm based on process performance data using a recursive least-squares procedure. The present invention also relates to an adaptive selection algorithm which is used to determine whether at least one previous predictive model-based algorithm parameter should be replaced with at least one new predictive model-based algorithm parameter in order to adapt the predictive model-based algorithm in response to a process change. The present invention also relates to a method for overlapping a delivery of at least one independently measured material with a delivery of a main material during a material transfer process.

DETAILED DESCRIPTION OF THE INVENTION

Figure 1:
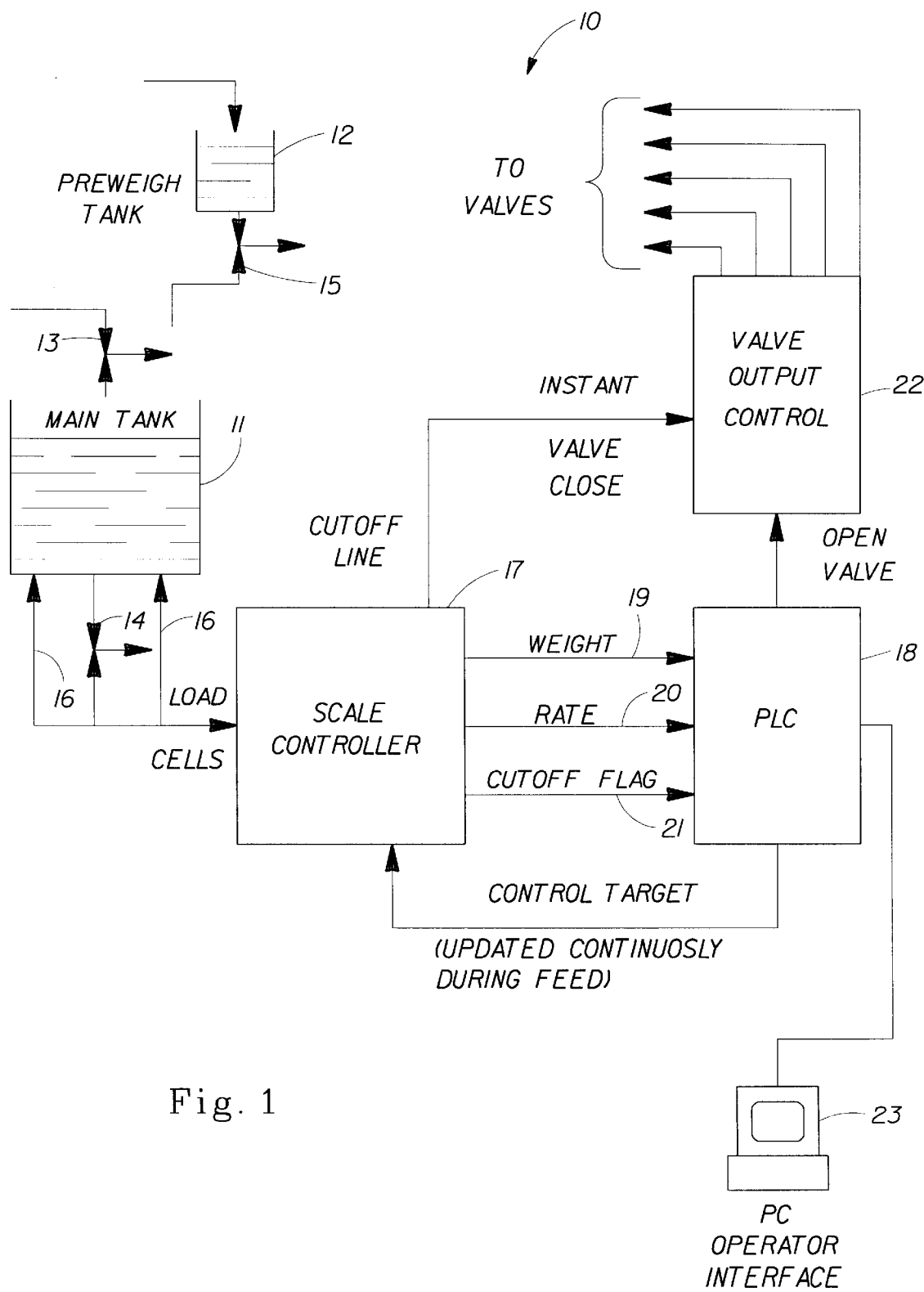
FIG. 1 is a schematic block diagram of apparatus for controlling an amount of material delivered during a material transfer.

FIG. 1 depicts a preferred embodiment of a system 10 in accordance with the present invention. System 10 is illustrated as having a mix tank 11 and a preweigh tank 12. Any number of mix tanks and/or preweigh tanks may be used. Materials, such as but not limited to liquids, powders, granules, may be used. These materials may be fed and measured into either tank 11, 12 through valves, such as valves 13–15. Any type of valve, such as but not limited a butterfly valve, may be used. The amount of material contained within either tank 11, 12 may be measured by use of load cells 16. Any type of load cell, such as but not limited those sold by Mettler Toledo, may be used. System 10 also incorporates a scale controller 17 which is connected to a programmable logic controller (PLC) 18. Scale controller transmits material delivery information such as material weight 19, material feed rate 20 and a cutoff flag 21 to PLC 18. Scale controller 17 and PLC 18 work together with valve output controller 22 to determine the appropriate time to close the valves which permit material feed in order to achieve the desired amount of material to be delivered. While a load cell scale and scale controller are described, one skilled in the art would appreciate the use of alternate measuring systems and/or controllers including, but not limited to, preweigh scale systems, flowmeters, weighbelt feeders and/or combinations thereof. Operator interface 23 allows a technician to access system 10 in order to create reports or perform other system related functions.

Figure 2:
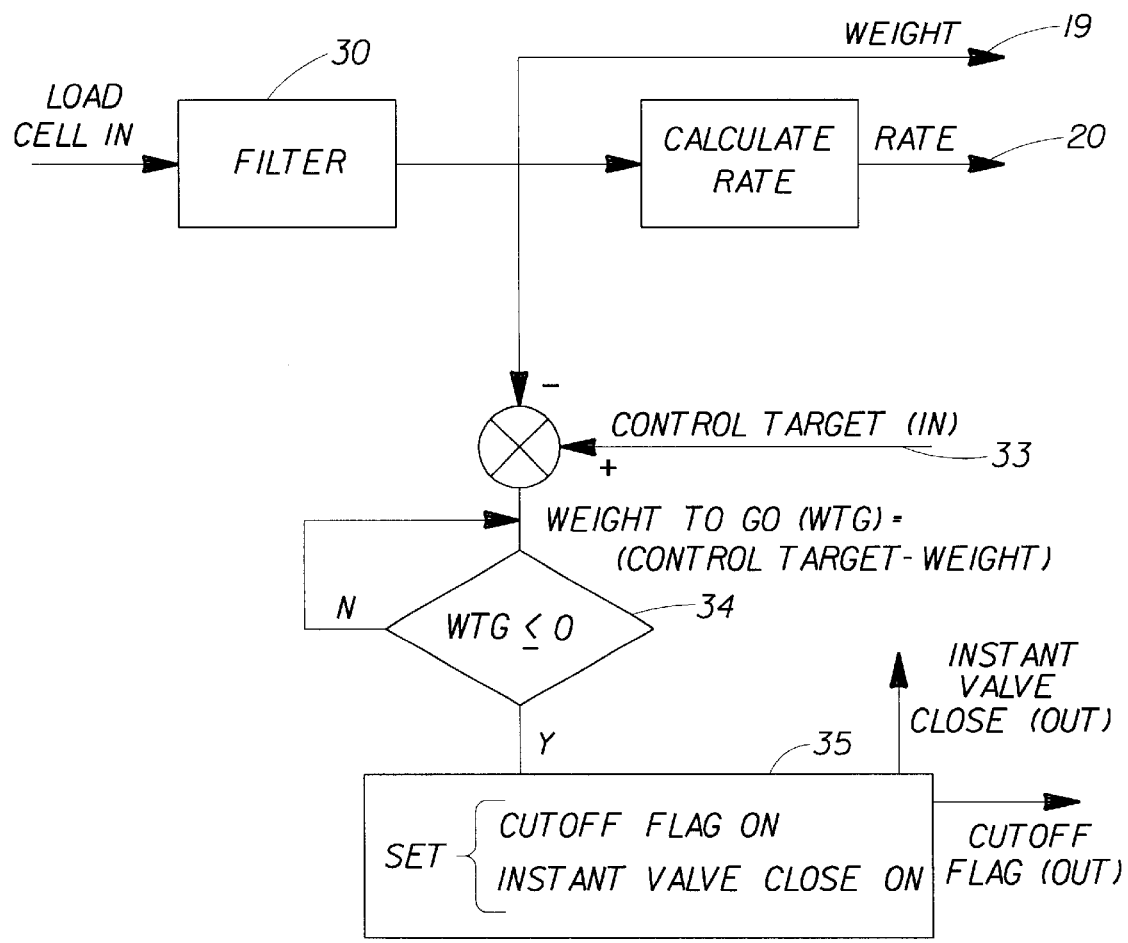
FIG. 2 is a schematic block diagram of control logic for determining the cut-off point of a material being delivered, this control logic may be incorporated into a scale controller.

Referring to FIG. 2, a schematic block diagram of control logic for determining the cut-off point of a material being delivered is illustrated. This control logic may be incorporated into scale controller 17. The input from load cell 16 may be filtered by filter 30 in order to reduce noise, such as noise caused by agitators within mix tank 11. Using the filtered input, weight 19 and material feed rate 20 is transmitted to PLC 18, as illustrated in FIG. 1. A control target amount 33, input from PLC 18, is compared to weight 19 within decision block 34 in order to determine the cutoff point for closing the material feed valves. Logic parameters are used in block 35 to facilitate the indication of when to close the valves, although other logic control methods may be employed.

Figure 3:
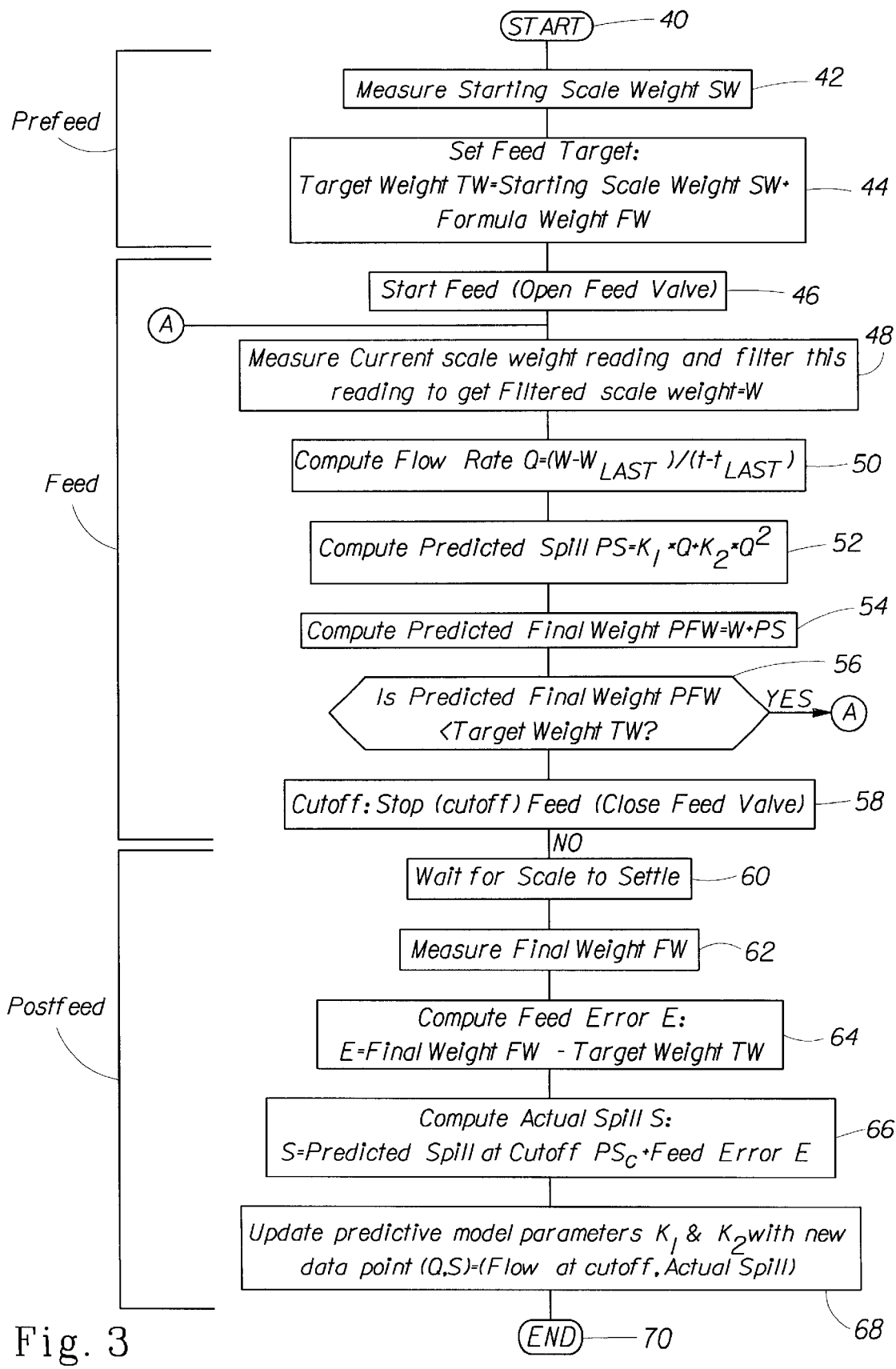
FIG. 3 is a flow chart showing a method for controlling an amount of material delivered during a material transfer.

Referring to FIG. 3, a flow chart showing a method for controlling an amount of material delivered during a material transfer is used. Standard flow chart symbols are used in FIG. 3 and FIG. 4, with rectangular blocks representing execution of a step such as starting of feeding or reading the weight of a material and the diamond blocks represent a decision made by system 10 and/or component. A circled letter to the right of the flow chart represents an exit point which re-enters the chart at the same circled letter on the left of the flow chart. This method begins at start block 40. The starting scale weight (SW) is measured in block 42. In block 44, the target weight (TW) is set to equal the SW+the formula weight (FW), wherein FW is the desired weight of the material to be delivered. Valve 13 is opened to permit the feeding of the main material in block 46. The current scale weight is read and then filtered, as depicted in FIG. 2, and set to filter scale weight (W) in block 48. The flow rate (Q) of the material is calculated as $Q=(W-W_{last})/(t-t_{last})$, wherein t is the duration of time during delivery and $W_{last}$ and $t_{last}$ are similar values for the previous readings. This step is performed in block 50. The predicted spill (PS) is defined and calculated in block 52 by the following predictive model $PS=K_1*Q+K_2* Q^2$, wherein $K_1$ and $K_2$ are parameters of the predictive model and are independent of the material flow rate, and Q is the measured or calculated flow rate of the material mentioned above. The predicted final weight (PFW) is defined and calculated as PFW=W+PS in block 54. In decision block 56, if PFW is less than TW, then the method exits from the circled letter "A" on the right and re-enters the flow chart at circled letter "A" on the left, else the method continues through to block 58. Valve 13, and the like, are closed or shutoff in order to stop the delivery of the material in block 58. A sufficient period of time (e.g. 1 to 3 seconds) is permitted to pass in order for the scale to settle in block 60. The final weight (FW) of the material is measured in block 62. A feed error (E) is defined and calculated in block 64 as E=FW−TW. An actual spill (S) is defined and calculated in block 66 as S=predicted spill at cutoff point $(PS_c)$+E. In block 68, the predictive model parameters, $K_1$ and $K_2$, are updated with the new data point (Q, S), wherein Q is equal to the material flow rate at cutoff point and S is the actual spill. This method ends at end block 70.

Predicted Spill and Predictive Model

The theory of the aforementioned predicted spill formula recognizes the effects of the following four components (a–d) which contribute to a discrepancy between the scale reading at any given moment and the final scale weight which would result if the feed was stopped at that moment—that is, the valve was given a command to close at that exact moment, termed the "cutoff" moment:

a. Material in Suspension—a portion of the material which has passed through the valve can still be in "free-fall" and has not yet reached the mix.

b. Deceleration Force—Force is required to stop the material which is falling into the mix. This dynamic force adds to the scale reading until the material flow has stopped.

c. Scale/Filter Lag—During feed, the scale reading at any moment can "lag" the actual weight on the scale when filtering is applied to dampen vibration due to agitators or other process components. Regardless of the type of filtering—mechanical, electronic or digital—the scale weight discrepancy, or lag, will increase as the feed flow rate increases. Greater filtering to increase smoothing also increases the lag.

d. Valve "Let-through"—Valves cannot be closed instantaneously. Some material passes through the valve while it is closing.

This discrepancy between the measured weight reading at the point of cutoff and the final weight of the material in the mix tank after the process "settles" is called spill, which is precisely defined as: Spill=final batch weight—scale reading at cutoff. Using this principle, a practical application was derived into a predictive model of $PS=K_1*Q+K_2*Q^2$, wherein Q is the measured or calculated flow rate of the material and $K_1$, $K_2$ are parameters of the predictive model which are independent of material flow rate Q.

Referring to the aforementioned predictive model of $PS=K_1*Q+K_2*Q^2$, when the initial downward velocity of the material being fed is either equal to zero or independent of flow rate, then the following values are used:

$$K_1 = \hat{O}_f + K_V - v_0/32.2$$

$$K_2 = 0$$

where, $\hat{O}_f$ is a filter composite time constant, $K_V$ is a valve let-through factor equal to $?_0{}^{tc}f[x_v(t)]\,dt$, and $v_0$ is the initial downward velocity of the material When the initial downward velocity of the material is proportional to flow rate, then the following values are used:

$$K_1 = \hat{O}_f + K_V,$$

$\hat{O}_f$ is a filter composite time constant, $K_V$ is a valve let-through factor equal to $?_0{}^{tc}f[x_v(t)]\,dt$, and $$K_2 = -1/(32.2*\rho*A_V),$$

$\rho$ is a density of the material, and $A_V$ is a cross-sectional area of a valve or other conduit through which the material moves from the source location to the target location.

Figure 4A:
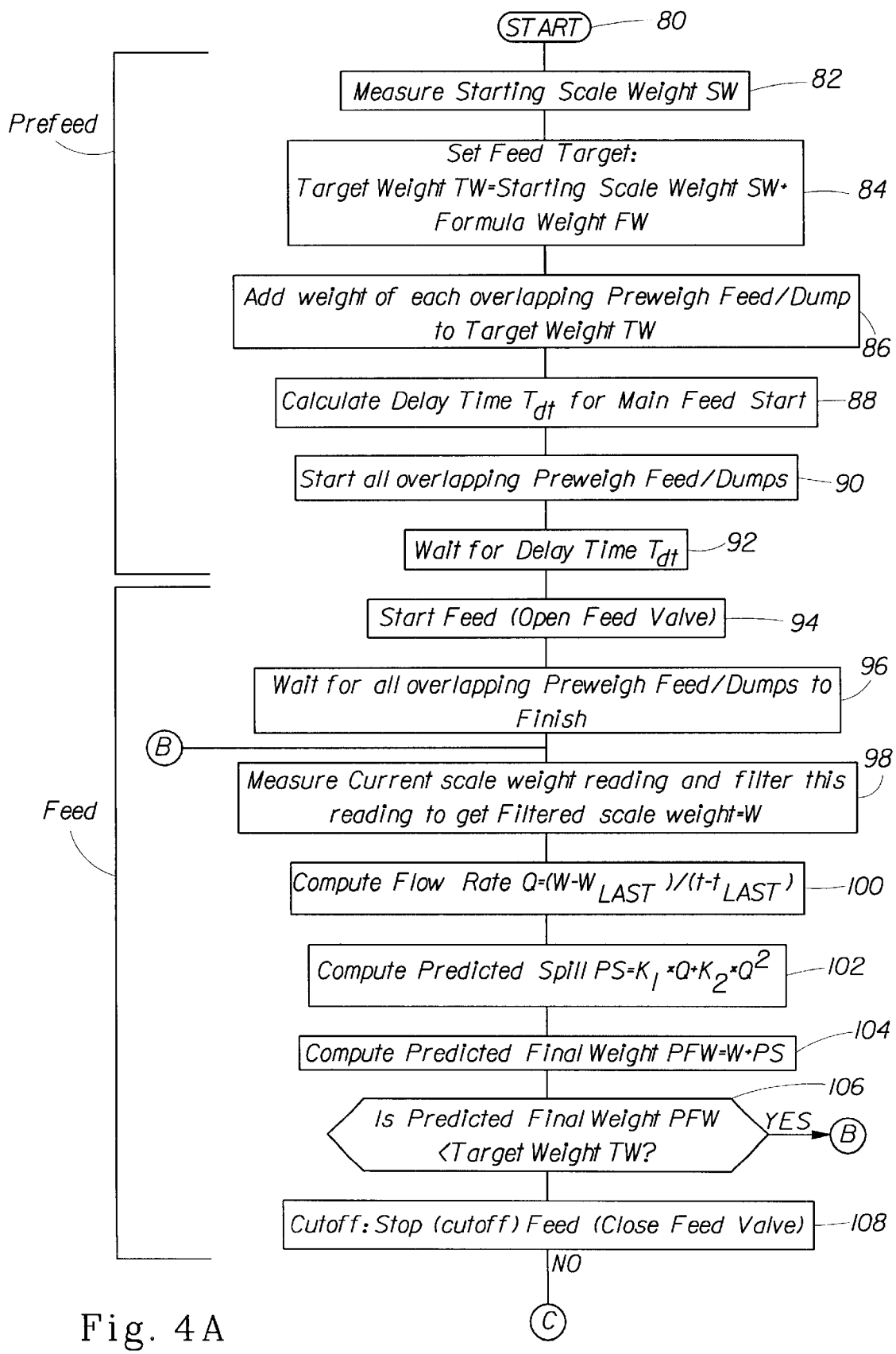
FIG. 4 is a flow chart showing a method for controlling the amounts and timing of multiple material feeds using an overlapping feed technique.
Figure 4B:
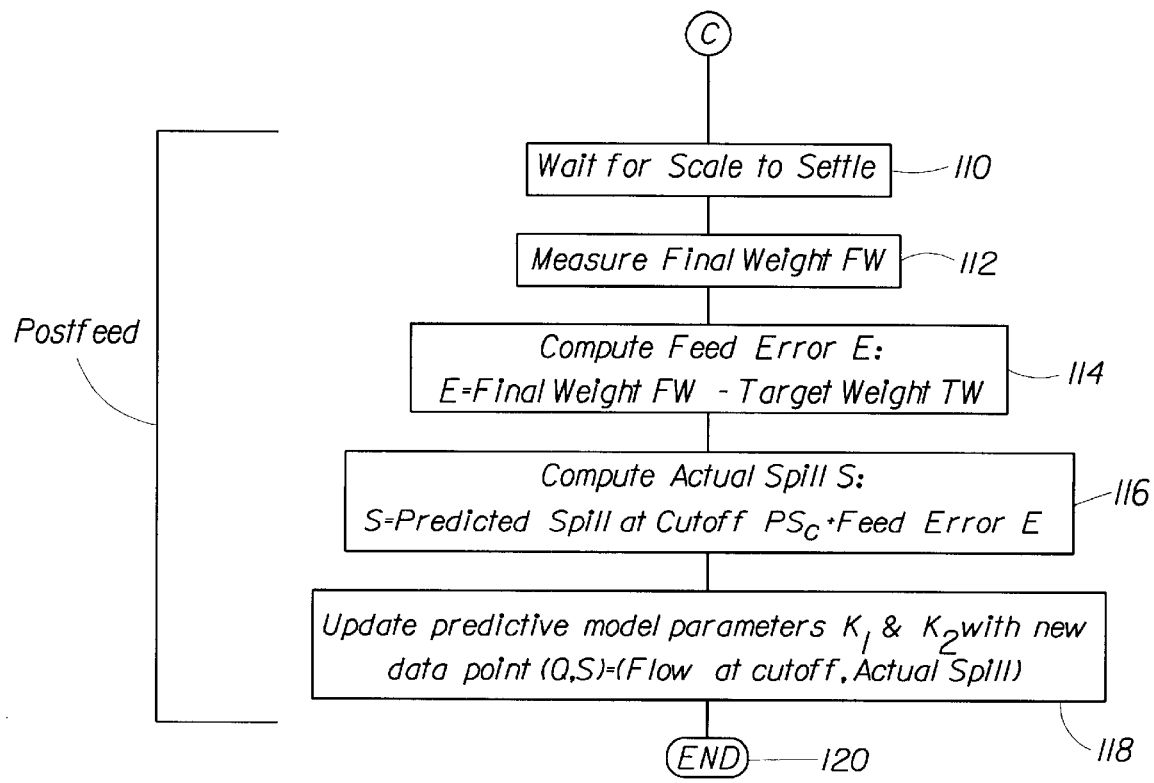

Referring to FIGS. 4A & 4B, a flow chart showing a method 3 for controlling the amounts and timing of multiple material feeds using an overlapping feed technique is used. This method begins at start block 80. The starting scale weight (SW) is measured in block 42. In block 84, the target weight (TW) is set to equal the SW+the formula weight (FW), wherein FW is the desired weight of the material to be delivered. The weight of each overlapping preweigh feed or dump is added to TW in block 86. Delay time, $T_{dt}$, is calculated in block 88 for the delaying of the feeding of the main material, also referred to as main feed start. All overlapping preweigh feeds or dump are started in block 90. Delay time, $T_{dt}$, is waited upon to expire in block 92 before the starting of the main material feed in block 94. In block 96, this method waits for all the overlapping preweigh feeds or dumps to complete. Target weight (TW) is adjusted by any weight errors in overlapping preweigh dumps or feeds. The method then progresses into block 98 where then the current scale weight is measured, filtered, and set to value (W). In block 100, the flow rate (Q) of the material is calculated as $Q=(W-W_{last})/(t-t_{last})$, wherein t is the duration of time during delivery and Wet and tlast are similar values for the previous readings. The predicted spill (PS) is defined and calculated in block 102 by the following predictive model $PS=K_1*Q+K_2*Q^2$, wherein $K_1$ and $K_2$ are parameters of the predictive model and are independent of the material flow rate, and Q is the measured or calculated flow rate of the material mentioned above. The predicted final weight (PFW) is defined and calculated as PFW=W+PS in block 104. In decision block 106, if PFW is less than TW, then the method exits from the circled letter "B" on the right and re-enters the flow chart at circled letter "B" on the left, else the method continues through to block 108. Valve 13, and the like, are closed or shutoff in order to stop the delivery of the material in block 108. A sufficient period of time (e.g. 1 to 3 seconds) is permitted to pass in order for the scale to settle in block 110. The final weight (FW) of the material is measured in block 112. A feed error (E) is defined and calculated in block 114 as E=FW−TW. An actual spill (S) is defined and calculated in block 116 as S=predicted spill at cutoff point $(PS_c)$+E. In block 118, the predictive model parameters, $K_1$ and $K_2$, are updated with the new data point (Q, S), wherein Q is equal to the material flow rate at cutoff point and S is the actual spill. This method ends at end block 120.

Adaptive Updating of the Predictive Model

Figure 5:
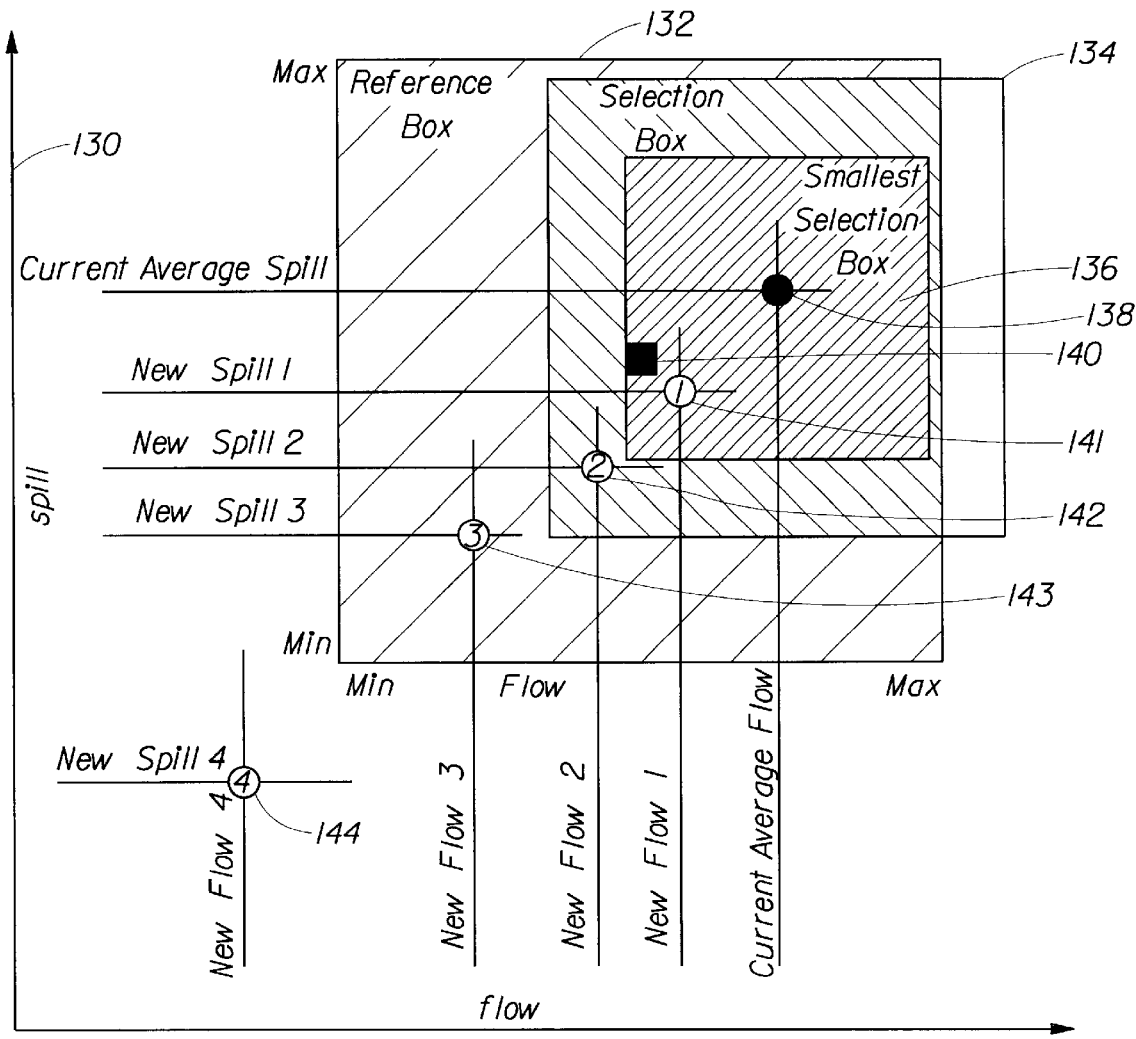
FIG. 5 is an example of a method for determining whether at least one previous predictive model-based algorithm parameter should be replaced with at least one new predictive model-based algorithm parameter in order to adapt a predictive model-based algorithm.

The predictive model parameters $K_1$ and $K_2$ are independent of flowrate Q but can change slowly due to process or material characteristic changes, such as makeup in valves or other process phenomena. After each feed of the material, the following routine and strategy is used to determine whether a new point (e.g. cutoff flow, actual spill) is valid for updating the predictive model. Referring to FIG. 5, a coordinate system 130 is defined to display values of a dependent variable versus values of at least one independent variable. The dependent variable is related to the independent variable by a mathematical function which is defined by a predictive model, as previously discussed. Next, a closed reference box 132 is defined on coordinate system 130. Closed reference box 132 has a fixed center point 140 located at values of the dependent and independent variables based on predetermined acceptable material delivery data values, wherein the dimensions of the closed reference box are initially set based on predetermined acceptable material delivery data values. These dimensions and center point 140 are subject to a rule-based adjustment using process performance data. Next, a finite number of successively smaller closed selection boxes 134, 136 (two boxes are used for the example in FIG. 5, however, any number of boxes may be used) are defined on coordinate system 130. Closed selection boxes 134, 136 each have a center point 138 located at values of the dependent and independent variables based on current averaged values of the dependent and independent variables as calculated from process performance data. The dimensions of closed selection boxes 134, 136 are defined by successively smaller fractional multiples of the closed reference box dimensions. Next, at least one decision rule is defined by which a specific new data point (as exampled 141, 142, 143, and 144 in FIG. 5) having values of the dependent and independent variables derived from process performance data can be used to select a specific rule by which the predictive model will be modified. The selection depends on which of the boxes 132, 134, 136 contain the data point. If the new data point 141 is contained within both of the smallest of the selection boxes 136 and closed reference box 132, then at least one predictive model parameter is updated. Else if the new data point 142 is contained within both the larger of the selection boxes 134 and closed reference box 132 but not within the smaller selection box 136, then at least one predictive model parameter is reset. Else if the new data point 143 is contained within closed reference box 132 but not within either of said selection boxes 134, 136, then on first occurrence within this region no change is made to any predictive model parameter. Else if the new data point 144 is outside closed reference box 132, then make no change to any predictive model parameter.

This routine or method is self-starting in that initial values of the predictive model-based algorithm parameters are automatically set from data of a first material delivery. Furthermore, this routine or method is self-correcting in that the predictive model-based algorithm parameters are reset when changed process or material characteristics meeting specified criteria are detected.

Update and Reset Equations

Separate predictive model parameters $K_1$ and $K_2$ are used and maintained for each different material in the batch sequence. The predictive model parameters $K_1$ and $K_2$ are updated or reset after each feed of the material according to the selection procedure described above. The equations used to perform this update or reset are derived using a conventional mathematical approach called "recursive least squares", which, for a sequence of data points, minimizes the sum of the square of the deviation between the actual data point and the estimate of the point provided by the predictive model. Each data point consists of cutoff flow Q as the independent variable and actual spill S as the dependent variable. After the material feed is completed, the new data point (Q, S) is used in the following equations to update or reset the predictive model parameters $K_1$ and $K_2$ and additional parameters, defined below, which are used in the predictive model.

Let $(Q_i, S_i)$, where $Q_i$=Cutoff Flow and $S_i$=Actual Spill, represent the new data point.

Call an initial data point (i.e., from the first feed of the material), or one that is to be used to reset the predictive model, $(Q_0, S_0)$ Define five additional parameters needed for the model as follows:

A=Average Flow

AA=Average Spill

B=Average (Flow)$^2$

BB=Average (Flow·Spill)

C=Average (Flow)$^3$

The aforementioned predictive model of $PS=K_1*Q+K_2*Q^2$ is then updated or reset according to the following equations:

For each new data point $(Q_i, S_i)$, where $Q_i$=Cutoff Flow and $S_i$=Actual Spill:

Update $$A_{NEW}=A_{OLD}+\beta\cdot(Q_i-A_{OLD}) \text{ (Average Flow)}$$

$$B_{NEW}=B_{OLD}+\beta\cdot(Q_i^2-B_{OLD})$$

$$C_{NEW}=C_{OLD}+\beta\cdot(Q_i^3-C_{OLD})$$

$$AA_{NEW}=AA_{OLD}+\beta\cdot(S_i-AA_{OLD}) \text{ (Average Spill)}$$

$$BB_{NEW}=BB_{OLD}+\beta\cdot(Q_i\cdot S_i-BB_{OLD})$$

Then, $$K_1 = \frac{C\cdot AA - B\cdot BB}{A\cdot C - B^2}$$

$$K_2 = \frac{A\cdot BB - B\cdot AA}{A\cdot C - B^2}$$

Initial Point ($Q_0, S_0$ & Reset:
 $A_0=Q_0$ (Average Flow)
 $B_0=Q_0^2$
 $C_0=Q_0^3$
 $AA_0=S_0$ (Average Spill)
 $BB_0=Q_0\cdot S_0$
Then, $$K_1 = \frac{AA}{A}$$

$K_2=0$

In the above equations, $\beta$ is a weighting factor having a value between 0 and 1. Smaller values of $\beta$ provide more weighting to previous data points. A value of $\beta=0.17$, which weights the $25^{th}$ most recent data point by 0.01 and the $50^{th}$ most recent point by 0.0001, has been used effectively in several applications of this method.

Overlapping Feed Technique

There is a multitude of process designs for batch manufacturing systems, all having their own unique benefits. One of the simplest systems consists of a multiple tank architecture. The tanks are sized to deliver materials at the necessary accuracy. This also allows parallel operations to increase throughput. These tanks are mounted on Load-Cell weighing devices and material movement is controlled by monitoring the change in weight. In general, this mandates only a single material movement at a time in any one tank.

Figure 6:
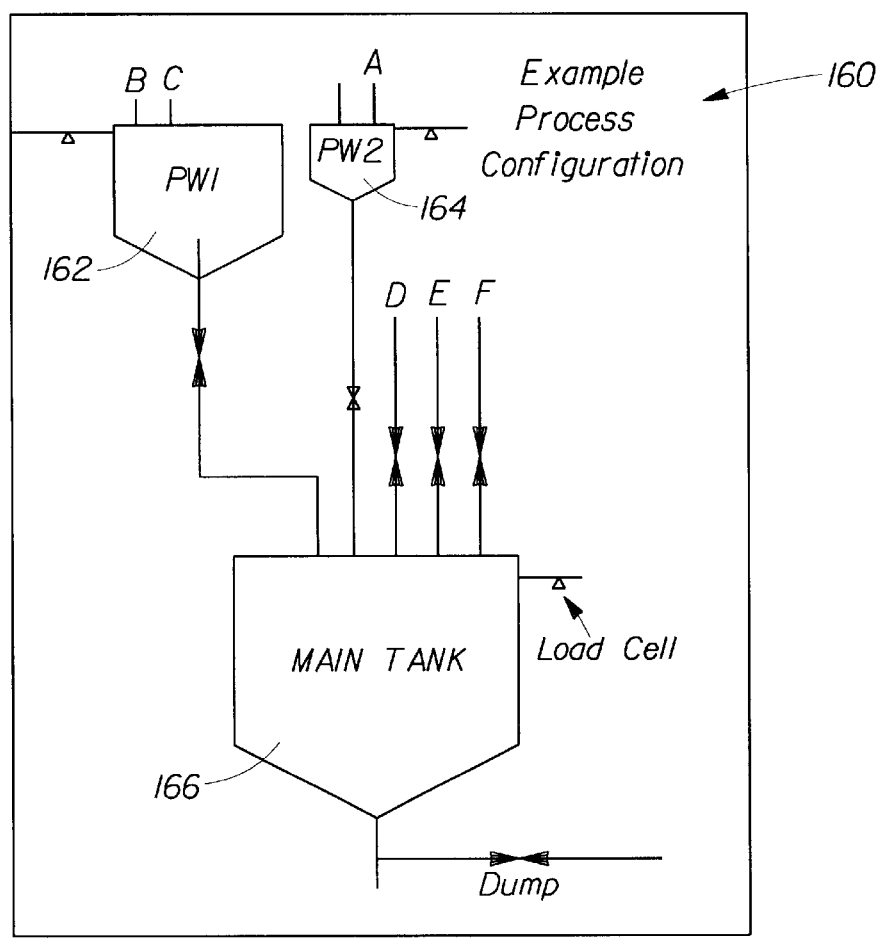
FIG. 6 is an example process configuration for a batch weighing/mixing system.

Referring to FIG. 6, this example process configuration 160 of a batch weighing/mixing has two preweigh tanks 162, 164 that support a main tank 166 in which a final product is made. This configuration allows intermediate materials to be processed in the upper tiered preweigh tanks 162, 164 and delivered to the lower tiered main tank 166 when required. While FIG. 6 depicts a system having two preweigh tanks, one skilled in the art would appreciate the use of alternate measuring systems and/or controllers including, but not limited to, flowmeters, weighbelt feeders and/or combinations thereof.

Traditional Operations

Figure 7:
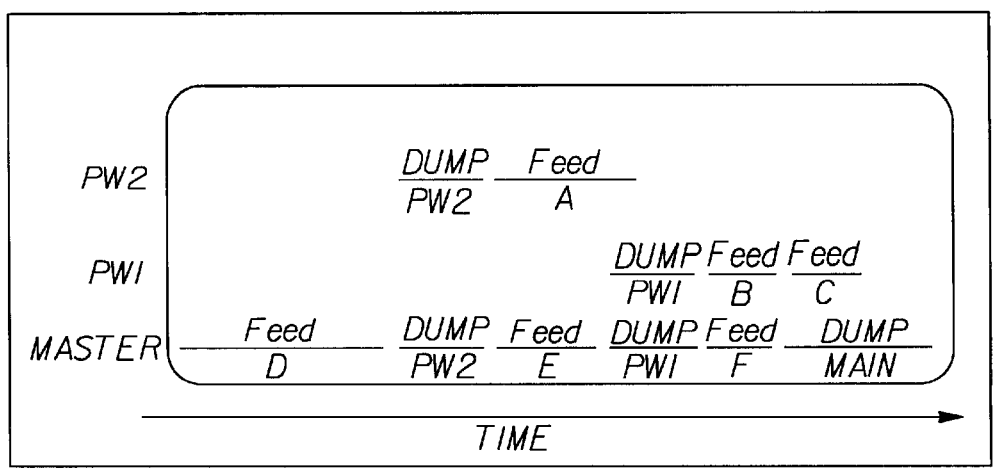
FIG. 7 is a diagram showing a traditional sequencing of multiple material feeds without the use of an overlapping feed technique as found in the prior art.

During the manufacturing of a product, each tank goes through its recipe cycle and interacts with the other tanks as shown in the traditional activity diagram in FIG. 7. In this example, the materials A, B & C are delivered to the preweigh tanks in parallel with the activities that are occurring in the main tank. When the main tank is ready to receive the pre-weighed intermediate materials, they are transferred to the main tank, with all other activity in the main tank suspended. This approach to batch manufacturing delivers quality product at an effective rate. As the need for additional product increases, however, adding additional manufacturing systems or increasing the number of manufacturing hours through overtime or more shifts are typical options.

Overlapping Preweigh Dumps and Material Feeds

Figure 8:
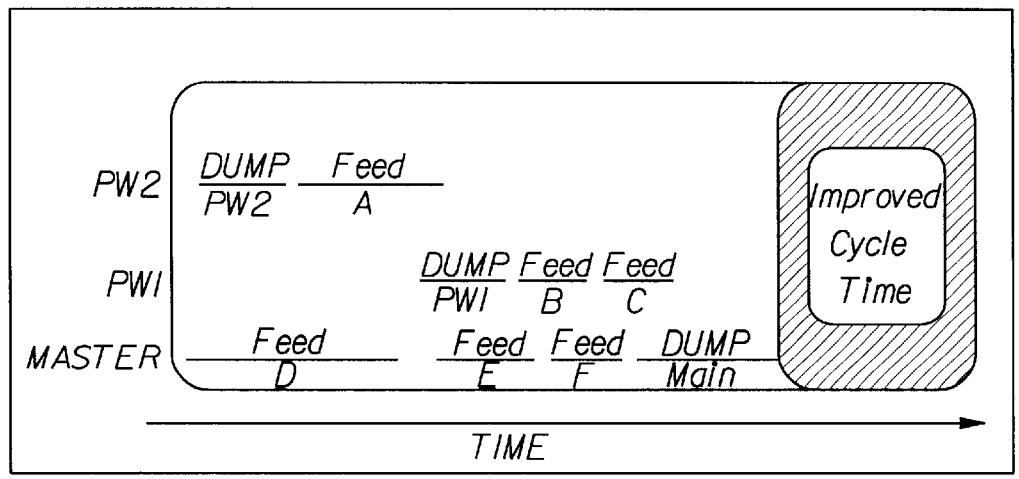
FIG. 8 is a diagram showing a new sequencing of multiple material feeds using of an overlapping feed technique as described by the present invention.

To reduce the batch cycle time, and thereby increase production, the present invention delivers a material using a load cell system at the same time that an intermediate material is transferred from a preweigh. This approach significantly increases the production of an existing process without making physical modifications. The decrease in cycle time is dependent upon several factors, each system must be evaluated to determine it's potential. As shown in the overlapping feed activity diagram in FIG. 8, the preweigh dumps are coordinated with a material feed so that both are being added to the main tank at the same time. For this to work and still accurately deliver the main material, the preweigh finishes its delivery before the material finishes its feed.

Figure 9:
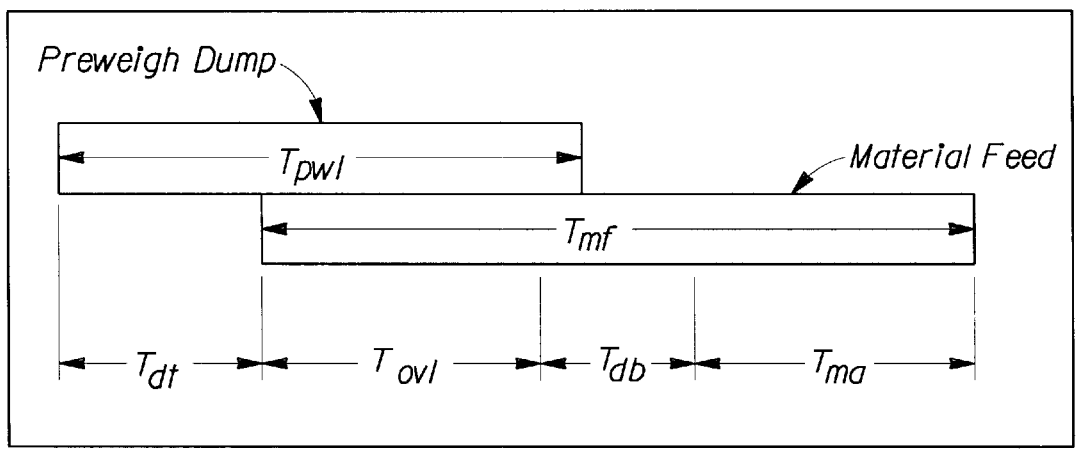
FIG. 9 is a diagram showing the calculations for the overlapping feed technique.

This overlapping feed technique works by maintaining information on the performance of most aspects of the process. This information, including material flow rates, tank sizes and drain times, is constantly being updated as the process is used. The information is then used to make the predictions necessary to perform the overlap feed as described in the timing diagram of FIG. 9. Referring to FIG. 9, the following definitions are provided:

$^T$db This is a "Dead-Band" time that the preweighs may intrude into without causing a problem with the material feed. This time is configurable by an engineer and is generally set to 5 seconds.

$^T$dt This is the calculated time that the main material will be delayed while the preweigh feeds so that the required ($^T$ma+$^T$db) is met.

$^T$ma This is the time that the material feed must feed alone, without any preweigh material coming into the main tank. If any preweigh feed will interfere with this feed alone time the material feed will be suspended. This time is configurable by an engineer and is generally set to 15 seconds.

$^T$mf This is the time that the material feed into the main tank is expected to take.

$^T$ovl This is the overlap time that the preweigh and material will both be feeding into the main tank.

$^T$pwl This is the greatest time that any selected preweigh(s) are expected to take to deliver the contents to the main tank.

Additional Descriptions $^M$act This is the actual flow rate at which the material is being delivered to the receiving tank. This is live data and is updated every second.

$^M$avg This is the materials average feed rate. This is updated at the end of every usage of that material.

$^M$etc. This is the number of seconds that the material is expected to take to finish its delivery. When the transfer is in progress, this is developed using live process data.

$^M$sp This is the amount of material that is to be added during the overlap operation.

$^{PW}$act This is the actual flow rate at which the preweigh is delivering its material to the receiving tank. This is live data and is updated every second.

$^{PW}$avg This is the historical average flow rate at which a preweigh will deliver its material to the receiving tank. This is updated at the end of every preweigh transfer.

$^{PW}$etc. This is the number of seconds that the preweigh is expected to take to deliver its material. When the transfer is in progress, this is developed using live process data.

$^{PW}$ma This is the mass that the preweigh is expecting to deliver to the receiving tank. It is determined at the time the receiving tank requests the preweigh to deliver its material.

During the overlap feed there are many process checks made to reduce the possibility of any process upset. Following are the steps and the sequence in which they occur when performing an overlap feed:

1. The system waits until all requested preweighs have finished all activity and are ready to transfer their material to the main tank.
2. The preweighs are evaluated to determine which will have the greatest, $^T$pwl, by the formula: $^{PW}$ma/$^{PW}$avg
3. The material feed time is calculated by the formula: $^T$mf=$^M$sp/$^M$avg
4. The total amount of material expected in the main tank is determined by combining all the expected preweighs' amounts, $^{PW}$ma, and the material feeds setpoint, $^M$sp, for a total.
5. The time to delay the start of the material feed is calculated using the greatest, $^T$pwl, as: $^T$dt=($^T$pwl-$^T$mf+$^T$db+$^T$ma) with $^T$dt never being less than zero.
6. All requested preweighs are instructed to begin their transfer.
7. When all preweighs have started their transfer and the, $^T$dt, has been satisfied, the material feed is started.
8. The feed alone time, $^T$ma, is monitored to make sure that no preweigh's transfer will violate the materials, $^T$ma, using the following method:

$$^T ma > ^M ect. - ^{PW} ect.$$

Based on the results of this comparison one of two things will happen.

a. If the feed alone time is not violated, the preweighs will finish transferring. The material will finish its feed and at the end of which all system data, including but not limited to information from the independently measured feeds, will be updated to reflect the current operation of the process.

b. If the feed alone time is violated then the following occurs:
  1. The feed is stopped.
  2. The preweighs finish their transfer and update their process data.
  3. The underweight of the material feed is determined and the operator is informed of the shortfall so that corrective action can be taken.
  4. The next usage of the material in an overlap feed is inhibited so that accurate system data can be collected.
  5. Normal overlap activity resumes after accurate data is collected.

The present invention may be implemented, for example, by operating a computer system to execute a sequence of machine-readable instructions. These instructions may reside in various types of signal bearing media, such hard disk drive and main memory. In this respect, another aspect of the present invention concerns a program product, comprising signal bearing media embodying a program of machine-readable instructions, executable by a digital data processor, such as a central processing unit (CPU), to perform method steps. The machine-readable instructions may comprise any one of a number of programming languages known in the art (e.g., Visual Basic, C, C++, etc.).

It should be understood that the present invention may be implemented on any type of computer system. One acceptable type of computer system comprises a main or central processing unit (CPU) which is connected to a main memory (e.g., random access memory (RAM)), a display adapter, an auxiliary storage adapter, and a network adapter. These system components may be interconnected through the use of a system bus.

The CPU may be, for example, a Pentium Processor made by Intel Corporation. However, it should be understood that the present invention is not limited to any one make of processor and the invention may be practiced using some other type of a processor such as a co-processor or an auxiliary processor. An auxiliary storage adapter may be used to connect mass storage devices (such as a hard disk drive) to a computer system. The program need not necessarily all simultaneously reside on the computer system. Indeed, this latter scenario would likely be the case if computer system were a network computer, and therefore, be dependent upon an on-demand shipping mechanism for access to mechanisms or portions of mechanisms that resided on a server. A display adapter may be used to directly connect a display device to the computer system. A network adapter may be used to connect the computer system to other computer systems.

It is important to note that while the present invention has been described in the context of a fully functional computer system, those skilled in the art will appreciate that the mechanisms of the present invention are capable of being distributed as a program product in a variety of forms, and that the present invention applies equally regardless of the particular type of signal bearing media used to actually carry out the distribution. Examples of signal bearing media include: recordable type media, such as floppy disks, hard disk drives, and CD ROMs and transmission type media, such as digital and analog communications links and wireless.

While particular embodiments of the present invention have been illustrated and described, it will be obvious to those skilled in the art that various changes and modifications may be made without departing from the spirit and scope of the invention, and it is intended to cover in the appended claims all such modifications that are within the scope of the invention.

What is claimed is:

1. A method for overlapping a delivery of at least one independently measured material with a delivery of a main material to a target location during a material transfer process, wherein the main material is solely measured at the target location and not measured at a source location.

2. The method of claim 1, wherein a final target batch weight is defined as the sum of a target amount for said main material and an aggregate sum of target amounts for said independently measured materials to be delivered, and said final target batch weight is updated after the delivery of each independently measured material, while main material is still being delivered, to reflect any delivery variation from the original independently measured material target amounts.

3. The method of claim 1, wherein said main material delivery is started at a time a $T_{dt}$ after independently measured feeds begin, calculated by the following equations:

If $(T_{pwl}-T_{mf}+T_{ma}+T_{db})$ is greater than zero, then $T_{dt}=(T_{pwl}-T_{mf}+T_{ma}+T_{db})$, else $T_{dt}=0$.

where, $T_{db}$ Is a dead-band time that the independently measured material delivery may intrude into without causing a problem with the main material delivery, $T_{dt}$ Is a calculated time that the main material delivery will be delayed while the independently measured material is delivered so that the required ($T_{ma}+T_{db}$) is met, $T_{ma}$ Is the time that the main material must be delivered alone, without any independently measured material being delivered, $T_{mf}$ Is the expected time to complete the main material delivery, and $T_{pwl}$ Is the largest time that any particular independently measured material is expected to be dispensed.

4. The method of claim 1, wherein said steps are contained within a computer-readable medium.

5. The method of claim 1, wherein said steps are contained within a digital control device.

6. The method of claim 1, wherein said steps are contained within a computer data signal embedded in a carrier wave.

7. A method for overlapping a delivery of at least one independently measured material with a delivery of a main material to a target location during a material transfer process, said method comprising the steps of:

inputting a target amount for a main material to be delivered from a source destination to a target destination, wherein the main material is not measured at the source destination and only measured at the target destination, and delivering the main material while simultaneously delivering at least one independently measured material.

* * * * *